Nov. 13, 1951        H. F. FRUTH        2,575,213
BIMETALLIC FASTENER
Filed Jan. 4, 1946
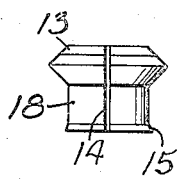
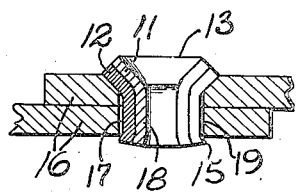
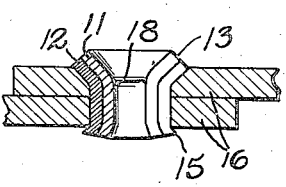
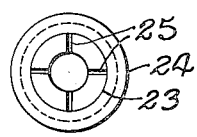
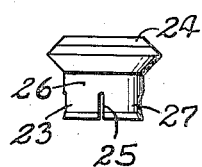
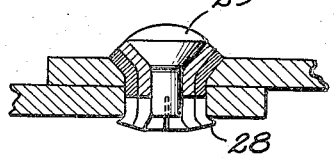
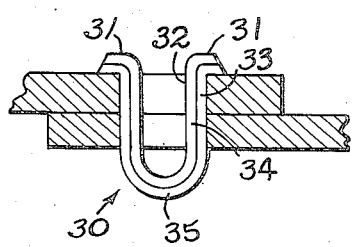
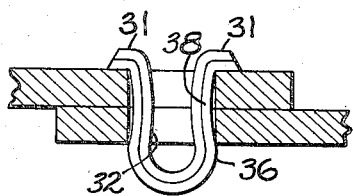
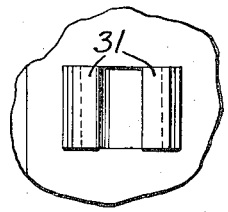
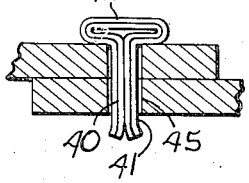
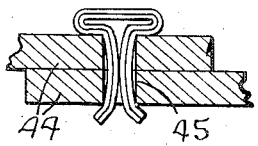
INVENTOR
Hal Frederick Fruth
By Carlson, Pitzner, Hubbard & Wogs
ATTORNEYS Patented Nov. 13, 1951

2,575,213

UNITED STATES PATENT OFFICE 2,575,213

BIMETALLIC FASTENER

Hal Frederick Fruth, Skokie, Ill.

Application January 4, 1946, Serial No. 639,046

4 Claims. (Cl. 85—40)

This invention relates to rivet-like fasteners.

Among other objects, the invention aims to provide an easily applied fastener which will function as a so-called blind rivet, that is one which may be applied by manipulation from only one side.

Another object is to provide a fastener of this character which may be applied without the use of presses or other riveting tools.

A further object is to provide a rivet which will automatically expand and upset without the use of the aforesaid tools.

Another object is to provide a fastener which may be easily removed without marring or destroying it, but which will not loosen accidentally despite the ease with which it may be removed.

A still further object is to provide a fastener of such character which will maintain continuous stress on the articles fastened together thereby.

Other objects and advantages will become apparent from the following description of illustrative fasteners embodying the invention and shown in the accompanying drawing.

In said drawing:

Figure 1 is an elevation of a tubular rivet or fastener;

Fig. 2 is a longitudinal section through the rivet and the material to be fastened thereby, showing the rivet after it has been inserted through the rivet holes but before it has been expanded;

Fig. 3 is a view similar to Fig. 2 after the fastener has been expanded;

Fig. 4 is an end view of a rivet similar to that shown in Fig. 1, wherein only a portion of the body has been slotted;

Fig. 5 is an elevation of the rivet shown in Fig. 4;

Fig. 6 is a sectional view similar to that of Fig. 3 showing the fastener of Fig. 5 in expanded condition;

Fig. 7 is a sectional view of a different form of fastening device in its initial condition;

Fig 8 is a similar view of the fastener shown in Fig. 7 in its expanded condition;

Fig. 9 is a top plan view of the fastening device shown in Fig. 7;

Fig. 10 is a section showing a different form of double pronged fastening device in contracted condition; and Fig. 11 is a similar view of the same fastening device in expanded or operative condition.

The illustrative fastener is characterized by bimetallic portions which automatically operate at temperatures to which the fastener is normally subjected in use, to provide an expanded ("upset") extremity analogous to that of a rivet for performing the fastening or riveting function. Under abnormal temperatures these bimetallic portions contract to permit the fastener to be inserted into or removed from the rivet hole. No press or other tool commonly used for other rivets, is required for expanding or "upsetting" the end of the fastener. Unlike ordinary rivets the present fastener may be removed simply by application of such abnormal temperatures as will cause contraction. The aforesaid expansion and contraction is effected by employing in the bimetallic portions of the fastener, metals which have substantially different coefficients of thermal expansion and contraction, such as brass (which has a relatively high coefficient) and Invar, an alloy of nickel and steel (which has a relatively low coefficient). Flaring or other expansion of the fastener tip occurs when the length at normal operating temperatures of a unit of the inner ply exceeds the length of an initially equal unit of the outer ply. This is true whether such expansion is the result of greater contraction of the outer ply (when the transition to normal temperature involves reduction of temperature) or great expansion of the inner ply when such transition involves an increase of temperature.

The relative arrangement of the two metals therefore depends on the relative temperature to which the fastener is normally subjected in use. For example, if the fastener is to be employed at ordinary atmospheric temperatures, the two metals are coupled so that the fastener will expand at such temperatures. It may be contracted to permit its insertion into the fastener hole (a) by application of heat (such as touching it with a heated solder iron) if the metal having the higher coefficient of expansion be placed outermost, or (b) by application of cold (such as touching it with a piece of Dry Ice or other cold material) if the metal having the higher coefficient of expension be placed innermost in the couple.

If the fastener is to be employed at temperatures which are normally substantially lower than atmospheric temperatures, the metal having the higher coefficient of expansion and contraction is placed outermost so that when the fastener (after being applied) is cooled to the normal operating temperature, the outermost metal will contract to a greater degree, thereby moving or flexing the bimetallic portions outwardly to expand or upset the fastener end thereby to secure the fastener in place. While such a fastener will normally contract at atmospheric temperatures, such contraction may be aided by application of heat. On the other hand, if the normal temperature to which the fastener is to be subjected is relatively high, that is substantially higher than the surrounding atmosphere, the metal having the higher coefficient of expansion is placed innermost so that the fastener will be contracted on the application of low temperatures to permit its insertion in the fastener holes and will expand to flex the fastener elements outwardly to fasten the fastener in place when subjected to the temperatures normally existing in use.

It will be understood that the fastening device is not limited to any specific pair of metals. Other metals than those enumerated having substantially different coefficients of expansion and contraction may be employed.

Various illustrative forms of fasteners are shown in the accompanying drawing. The fastener illustrated in Figs. 1, 2 and 3 is of tubular form comprising inner and outer layers or plies 11 and 12 of metals having substantially different coefficients of expansion and contraction. These plies of metals are advantageously firmly secured together as by brazing. Other methods of securely bonding or securing the plies together may be employed. The firmness of the bond determines (assuming the fastener otherwise have adequate strength) the fastening or riveting force exerted by the fastener. The present form of rivet may advantageously be made from tubular bimetallic stock cut in sections of appropriate length and expanded or upset at one end to provide a fastener head 13. The fastener head may of course be provided by other means, such as a separate head element attached to the fastener shank. The fastener is slotted longitudinally as at 14 to permit the necessary flexure or movement during expansion and contraction. The opposite extremity of the fastener may advantageously be slightly flared outwardly as at 15 to provide the nucleus to initiate a gripping or riveting force when the fastener is expanded. In contracted condition (see Fig. 2) the flared portion 15 is of a small enough diameter to permit the rivet to be passed through the materials 16 to be fastened together. In Fig. 2 the slight clearance 17 between the body 18 of the rivet and the hole 19 in the material in which the rivet is inserted represents the extent to which the extremity 15 is initially enlarged.

For use under most conditions the fastener is quickly contracted for insertion into the hole 19 (see Fig. 2) by contacting it with a heated solder iron or other heated tool. Thereafter, when the rivet is subjected to the temperatures which normally exist in use it expands, as illustrated in Fig. 3 to grip the material 16 between the head 13 and the expanded extremity 15. Any axially extending section of the fastener can be considered, by reason of the portions 13, 15, to be straddling the layers 16 to prevent any axial separation thereof.

In Figs. 4, 5 and 6 a slightly different form of fastener 23 is shown. Such fastener may likewise be formed from tubular bimetallic stock similar to that from which the rivet shown in Fig. 1 is formed. In the case of the fastener 23 the stock is cut into sections of appropriate length and thereafter provided with a head 24 by enlarging or otherwise as with the fastener of Fig. 1. In this case, however, only portions of the rivet body are slotted as at 25, leaving a continuous tubular shaft 26 and providing a plurality of fingers 27 which will flex outwardly and inwardly on changes of temperature as above described. By dividing the fastener secured into a plurality of independent fingers 27, a more efficient flaring or expanding of the fastener to form the head 28, is obtained.

If desired a plug 29 may be inserted in the rivet after expansion to prevent leakage through the rivet under conditions where this is important.

In Figs. 7 and 8 a different form of fastener, designed particularly for rectangular holes, is illustrated. Such fastener 30 is generally of U-shape with its extremities flanged or outwardly bent to provide a head 31 and shank 32 comprising plies 33 and 34 of metals having substantially different coefficients of expansion and bonded together as above described. Under abnormal temperatures the rounded tip 35 enlarges as at 36 (Fig. 8) to a size larger than the hole 37. This enlargement is accompanied with an inward bowing of the legs or shank 32 as at 38 (Fig. 8).

This fastener may advantageously be made of bimetallic strip stock cut to proper length and bent to the shape above described.

In Figs. 10 and 11 another type of fastener is illustrated. This fastener comprises a pair of bimetallic prongs or fingers 40 and 41 which lie closely adjacent each other at abnormal temperatures. The fastener is advantageously formed from a strip of bimetallic stock doubled on itself into T-shape to provide an integral head 42. A similar result may be obtained by attaching bimetallic fingers to a separately formed head. The bimetallic fingers 40 and 41 are designed to flex outwardly as shown in Fig. 11 when subjected to temperatures normal to the use of the fastener. Such expansion causes the extremities 43 of the fingers to curve outwardly and to grip the material 44 to be fastened. A fastener of this character is designed particularly for use in narrow holes or slots 45. For use at atmospheric temperatures two metals comprising the fingers are arranged with that having the higher coefficient of expansion outermost so as to contract the fingers when heated and separate them on cooling. After the fastener has been inserted and cooled to its operating temperature the fingers flex outwardly as shown in Fig. 11.

It will be noted in the embodiment of Figs. 10 and 11 that the head portion 42 forms a bracing connection between the opposed portions 40, 41 and enables the latter to exert a mutually outward force. One skilled in the art will readily perceive that a similar bracing connection is present in all of the embodiments. In the forms of the invention disclosed in Figs. 1 to 6, for example, the fastener has opposed portions (exposed in cross section) which are enabled to bear radially outwardly on the walls of the apertures only because of a third or connecting portion of the fastener which forcibly retains the opposed portions in their spaced relationship.

Obviously the invention is not limited to the details of the illustrative fasteners since these may be variously modified. Moreover it is not indispensable that all features of the invention be used conjointly since various features may be used to advantage in different combinations and subcombinations.

I claim as my invention:

1. A rivet for insertion at an abnormal temperature into an aperture formed in a plurality of superimposed structural members for clamping them rigidly together upon return to a normal temperature condition comprising, in combination, a tubular body including concentric cylindrical bonded layers of metals having appreciably different temperature coefficients of expansion, the first end of said tubular body having a permanent outward flare of greater diameter than the aperture, said body having a longitudinal slot therein, said bonded layers being arranged in such order as to expand radially at temperatures to which the fastener is normally subjected in use, said body having a minor flare at its opposite end said minor flare being of smaller diameter than said aperture in the unexpanded position of said body for insertion through said aperture and for gripping the terminal edge of said aperture upon radial expansion of said body.

2. A rivet-like fastener comprising, in combination, a tubular body including inner and outer bonded concentric cylindrical plies of metals having appreciably different temperature coefficients of expansion for insertion into a fastener hole, said body having radially opposed sections separated from each other by a longitudinal slot intersecting at least one end of said body to permit longitudinal bowing as well as relative radial movement of said opposed sections, said body also having a bracing connection between said opposed sections to oppose the inward movement of the latter, said metal plies being disposed radially of each other to cause the outermost ply to shorten relative to the inner ply at normal temperatures so that said body expands peripherally and also curves relative to the axis to grip said sheets against axial movement of the latter.

3. A rivet-like device for insertion in registering apertures in sheets of material or the like to fasten them together comprising, in combination, a tubular body having a single longitudinal slot intersecting at least one end of said body, said body including first and second bonded cylindrical plies of metal in concentric relation to each other, the first of said plies being comprised of a metal having a substantially different temperature coefficient of expansion and contraction relative to the metal of said second ply and being radially positioned relative to said second ply to cause the outer of said plies to shorten in respect to the inner of said plies over a temperature differential from abnormal to normal temperatures, at said abnormal temperature said body being contracted to permit insertion in said apertures, said body being longer than the combined thickness of said sheets of material so that the slotted end thereof projects out of said hole for gripping said sheets of material upon expansion of said body at said normal temperatures.

4. A fastener of the character described comprising, in combination, a tubular body including a bimetallic sleeve for insertion in a fastener hole or the like, said bimetallic sleeve including concentric and substantially axially coextensive cylindrical bonded layers of metal arranged in radially outward order to cause the outer one of said layers to be relatively shorter than said inner layer at normal temperatures, said body shaped at one end to form a flared head and being longitudinally slotted at the other end to permit the latter to expand outwardly beyond the fastener hole at normal temperatures and contract inwardly at abnormal temperatures to permit insertion into and removal from said hole.

HAL FREDERICK FRUTH.

REFERENCES CITED

The following references are of record in the file of this patent:

UNITED STATES PATENTS

| Number | Name | Date |
| --- | --- | --- |
| 1,478,028 | Decker | Dec. 18, 1923 |
| 1,983,269 | Derby | Dec. 4, 1934 |
| 2,196,671 | Gille | Apr. 9, 1940 |
| 2,220,978 | Shakespeare | Nov. 12, 1940 |
| 2,251,278 | Hays | Aug. 5, 1941 |
| 2,362,424 | Walsh | Nov. 7, 1944 |
| 2,368,193 | Boynton | Jan. 30, 1945 |
| 2,377,222 | Fruth | May 29, 1945 |

FOREIGN PATENTS

| Number | Country | Date |
| --- | --- | --- |
| 303,126 | Great Britain | Sept. 26, 1929 |